United States Patent [19]

Com-Nougue et al.

[11] Patent Number: 5,321,778
[45] Date of Patent: Jun. 14, 1994

[54] METHOD AND APPARATUS FOR PRODUCING A PRESTRESSED FIBER-OPTIC SENSOR

[75] Inventors: Jacques Com-Nougue, Paris; Emmanuel Kerrand, Villabe; Joël Boby, Montfermeil, all of France

[73] Assignee: Societe Anonyme dite: Alcatel Cable, Clichy Cedex, France

[21] Appl. No.: 10,193

[22] Filed: Jan. 28, 1993

[30] Foreign Application Priority Data

Jan. 29, 1992 [FR] France .................. 92 00952

[51] Int. Cl.⁵ .................................. G02B 6/00
[52] U.S. Cl. ............................. 385/13; 385/12
[58] Field of Search .................... 385/12, 13

[56] References Cited

U.S. PATENT DOCUMENTS

| | | | |
|---|---|---|---|
| 4,750,796 | 6/1988 | Shibata et al. | 385/13 |
| 5,028,141 | 6/1991 | Griffiths | 385/13 |
| 5,193,129 | 3/1993 | Kramer | 385/13 |

Primary Examiner—Rodney B. Bovernick
Assistant Examiner—Stephen W. Barns
Attorney, Agent, or Firm—Sughrue, Mion, Zinn, Macpeak & Seas

[57] ABSTRACT

A method for producing a prestressed fiber-optic sensor of two superposed metal strips (2,3) sheathing an optical fiber (1) with the strips being secured to each other along their lateral sides to provide a sheath exerting a prestress on the optical fiber includes a first step of superposing the lateral sides of the strips and aligning the edges of the strips. The superposition of the sides is carried out so as to produce a desired prestress on the optical fiber after the sides have been secured together. In a further step, the strips are continuously welded to each other to unite the adjacent edges after superposition of their lateral sides. The welding is performed simultaneously along both sides of the strips and with the same input of energy. The invention also relates to apparatus for carrying out the method and a prestressed fiber-optic sensor produced thereby.

17 Claims, 4 Drawing Sheets

METHOD AND APPARATUS FOR PRODUCING A PRESTRESSED FIBER-OPTIC SENSOR

The invention relates to a method and apparatus for producing a prestressed fiber-optic sensor.

A known prestressed fiber-optic sensor comprises two metal strips sheathing an optical fiber, the strips being secured to each other along their lateral sides to form a sheath which exerts a radial prestress on the optical fiber. The prestress is due to the pressure exerted on the fiber by the metal strips which are tensioned transversely before being secured to each other. Such a sensor may be used for monitoring road traffic if laid across the road.

Such a sensor is still only in the realms of the laboratory. In order to implement it in practice, an optical fiber 125 $\mu m$ in diameter can be used with metal strips which are 76 $\mu m$ to 80 $\mu m$ in thickness, 1 cm wide and about 4 m in length.

Securing the metal strips together along their lateral sides ensures prestress of the optical fiber. The response of the sensor depends on the variation in the prestress exerted on the sensor. The method of securing the strips should provide a uniform prestress along the entire length of the sensor due to the small thickness of the metal strips and the small diameter of the optical fiber.

If the strips are secured to each other by welds that are not symmetrical relative to the two strips which form the sheath, stresses are induced that produce deformation and asymmetry with consequent variation in the amount of prestress. In order for the prestress to be uniform and symmetrical, the strips must be joined in continuous and regular manner.

The applicant has also ascertained that the edges of the sensor must be made moisture-proof. This reduces the risk of corrosion between the two strips which would lead to splits in the welding bead. This is particularly important if the sensor is used for monitoring road traffic. In that case it is subjected to severe stresses due to considerable variations in temperature, humidity, salting of the roads and other forms of pollution.

In order to satisfy all these requirements, it is proposed according to the present invention to weld the two strips to each other after superposing the lateral sides of the strips and aligning their edges. In order to avoid any asymmetry or deformation, both sides of the strips are welded simultaneously with the same input of energy. The welding unites the edges of the strips.

The invention thus provides a method and apparatus for producing a prestressed fiber-optic sensor, the sensor comprising two superposed metal strips sheathing an optical fiber, the strips being secured to each other along their lateral sides to provide a sheath exerting a prestress on the optical fiber, the method being characterized in that it comprises:

a step of superposing the lateral sides of the strips and aligning the edges of the strips, the superposition of the sides being carried out so as to produce a desired prestress on the optical fiber after the sides have been secured together;

a step of welding the strips to each other so as to unite the adjacent edges after superposition of their lateral sides, the welding being performed simultaneously along both sides of the strips and with the same input of energy.

Advantageously, the welding is carried out using laser beams along the edges of the metal strips. Laser welding is in fact very suited to the small thicknesses of the metal strips.

Preferably, the laser beams are obtained by splitting a single initial laser beam. This readily provides beams of equal energy.

The laser beams are preferably pulsed which allows good control of weld thickness.

The welding may also be performed by microplasma, either along the edges of the metal strips or along the lateral sides of the metal strips. It is equally possible to use seam welding.

The invention further provides apparatus for carrying out the above methods, characterized in that it comprises means for superposing the lateral sides of the strips and applying prestress, means for aligning the edges of the strips, and means allowing simultaneous welding of the edges of both sides of the strips.

The means for superposing the lateral sides of the strips and for applying the prestress may comprise wheels for pressing the lateral sides of the strips. These wheels may be situated on either side of the assembly constituted by the two metal strips.

The apparatus may also include at least one wheel for supporting the optical fiber.

The alignment means may comprise rollers between which the metal strips run.

The invention therefore provides a prestressed fiber-optic sensor constituted by two superposed metal strips sheathing an optical fiber, the strips being secured to each other along their first and second lateral sides by securing means so as to constitute a sheath exerting a prestress on the optical fiber, the invention being characterized in that said securing means are constituted by continuous welds formed along the aligned edges of the metal strips and made with the same input of energy along both sides.

The invention, will be better understood and other advantages and features will be apparent from the following description which is given by way of nonlimiting limiting example the accompanying drawings in which.

Figure 1:
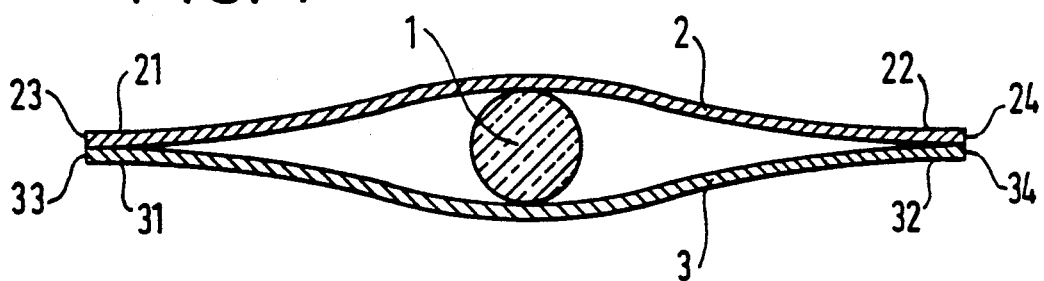
FIG. 1 is a cross section through a prestressed fiber-optic sensor.

A prestressed fiber-optic sensor, such as that shown in cross section in FIG. 1, comprises an optical fiber 1 situated in the center of a sheath constituted by two metal strips 2 and 3 secured to each other along their lateral sides. Thus lateral side 21 of strip 2 is secured to lateral side 31 of strip 3 and lateral side 22 of strip 2 is secured to lateral side 32 of strip 3. The securing is carried out in such a way as to ensure prestressing of the optical fiber 1. The optical fiber and the metal strips may have the dimensions previously mentioned. The metal strips may be of stainless steel or of another material which is corrosion resistant.

For example the following materials may be used for the metal strips:

the alloy known as INCONEL 625 produced by Aubert and Duval which includes nickel, iron, chromium and molybdenum;

the alloy known under the trademark HASTELLOY X produced by Aubert and Duval which comprises the same constituents but in different proportions;

the alloy known as PHYNOX produced by Imphy which includes cobalt, iron and nickel;

the stainless steel Z2NCDU 25-20 produced by Ugine which is a high-alloy steel containing 0.02% carbon, 25% nickel, 20% chrome, molybdenum, copper, silicon and manganese.

According to the invention, the metal strips 2 and 3 are welded together by welds which unite their edges, the latter being aligned on both sides. Thus edge 23 of strip 2 is aligned with edge 33 of strip 3 and edge 24 of strip 2 is aligned with edge 34 of strip 3.

In view of the small thickness of the metal strips, laser welding is particularly appropriate. A pulsed laser beam gives the advantage of ready control of the weld thickness compared with a continuous laser beam.

However, use of laser welding requires certain precautions.

In order to obtain a good weld and avoid degradation of the fiber, the distance between the sides to be joined must be as small as possible. In fact, if the laser welding beam passes through the zone where the two sides are being assembled together, it may impair and even destroy the optical fiber.

The apparatus according to the invention allows welding along the edges without risk to the optical fiber.

Figure 2:
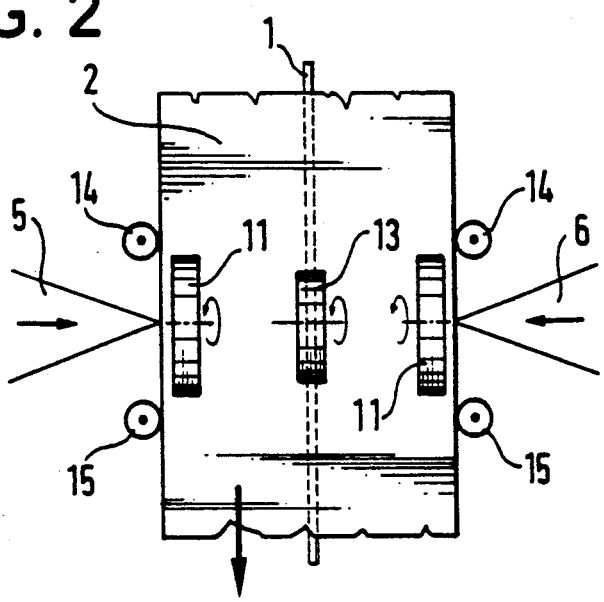
FIG. 2 and 3 are top and side views respectively of part of the apparatus according to the invention.
Figure 3:
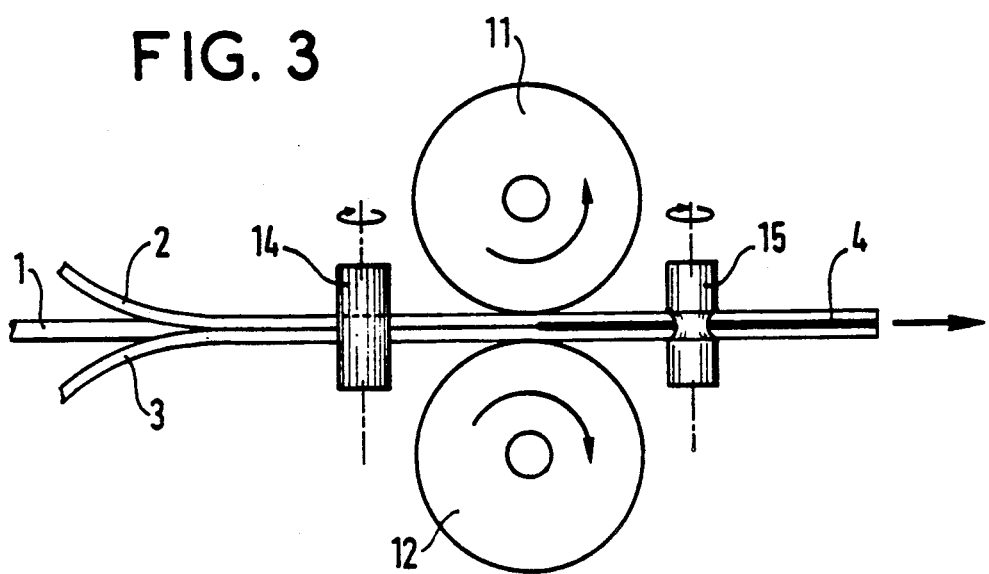

FIGS. 2 and 3 show suitable positioning of the metal strips and the optical fiber for laser welding along the edges of the strips. Strips 2 and 3 are paid out from their support reels and are driven between upper and lower pressing wheels 11 and 12 engaging the margins of the strips. These pressing wheels ensure superposition of the lateral sides of the strips and impart transverse tension to the strips. There may be two upper and two lower wheels, the axes of these wheels all being in the same transverse plane relative to the strips which run horizontally. As the welds will be formed in close proximity to the pressing wheels, the latter are made of a refractory material, such as ceramic, an element which has good resistance to temperature. The peripheries of the pressing wheels which come into contact with the strips may be plain or chamfered.

The distance separating the pressing wheels from the edges of the strips may be several tenths of a millimeter. The upper wheels may be mounted on fixed axles and the lower wheels on moveable axles.

Optical fiber 1 may be maintained in a central position by support wheels 13 situated above and below the fiber and along the same axis as the pressing wheels 11 and 12. The periphery of each support wheel may be provided with a groove to ensure better support. The support wheels may for example be of steel. The optical fiber is driven between the strips by pulling and/or by rotating the support wheels. The pressing and support wheels may be driven by the same drive system.

Alignment of the edges may be achieved by rotating front and rear rollers 14 and 15. As welding takes place between the front and rear rollers, it is preferable for each of the rear rollers to have a transverse channel to facilitate passing the additional thickness caused by the presence of the welded joint.

The rotational speeds of the pressing and support wheels and of the rollers may be related so that the linear speeds of their points of contact with the metal strips are the same. This may be done in known fashion by using a common drive system.

Welding of the edges is carried out between the pressing wheels 11 and 12 so as to produce welded joints 4. It is carried out by means of laser beams 5 and 6.

Welding is carried out simultaneously on the two edges by using two laser beams of the same optical characteristics, obtained by splitting a pulsed laser beam emitted either by a $CO_2$ source or by a YAG source.

Figure 4:
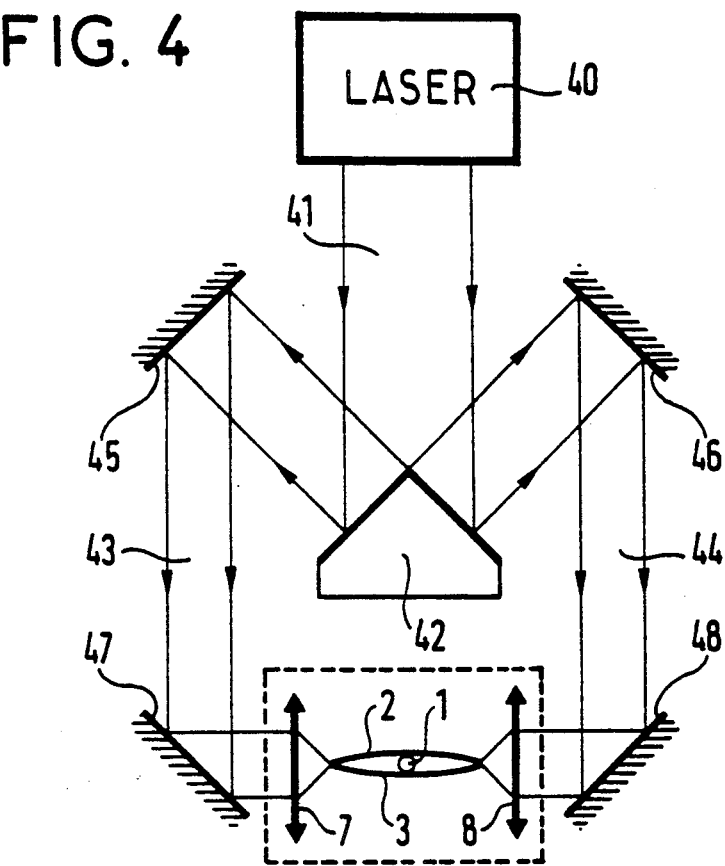
FIG. 4 shows a first variant of the laser welding system which may be used within the context of the invention.

As shown in FIG. 4, the laser beam may be transported and split by a mirror system. This mirror system is used with a $CO_2$ laser (wavelength 10.6 $\mu$m). Laser 40 emits a beam 41 which is split by beam-splitting mirror 42 into two identical beams 43 and 44 which are directed by mirrors 45, 46, 47 and 48 towards focussing lenses 7 and 8. Lenses 7 and 8 focus the laser beams onto both edges of the metal strips.

Figure 5:
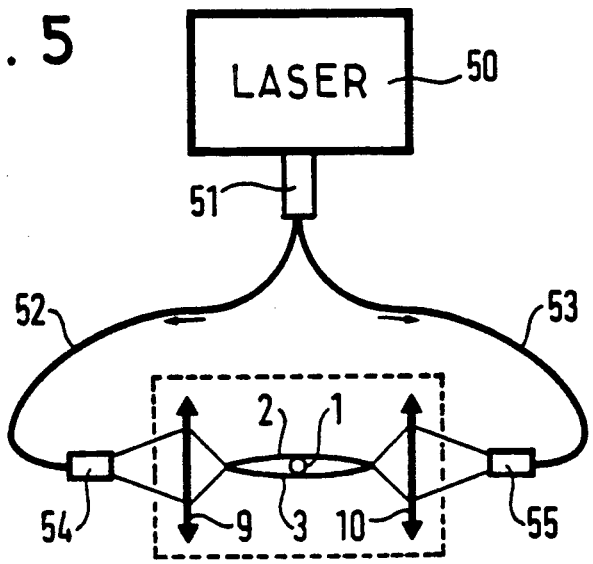
FIG. 5 shows a second variant of the laser welding system which may be, used within the context of the invention.

The use of mirrors implies precise positioning. These positioning problems can be avoided by using a Nd:YAG laser (wavelength 1.06 $\mu$m) as shown in FIG. 5. In this case, laser 50 emits a beam which is separated into two identical beams by a separator 51 placed directly at the output of the laser. These beams are then conveyed by two optical fibers 52 and 53 to optical instruments 54 and 55 which cause the light beams to diverge towards focussing lenses 9 and 10 which focus the laser beams onto both edges of the metal strips.

Laser welding is an efficient method for fastening together the two metal strips. If certain factors are given priority (production cost, manufacturing speed, simplicity, reliability, mechanical strength of the weld, etc.) other assembly methods may be considered, such as seam welding or microplasma welding. These two methods provide a uniform melt region on the two strips, the plane in which the strips are joined being approximately the plane of symmetry of the melt region.

Figure 6:
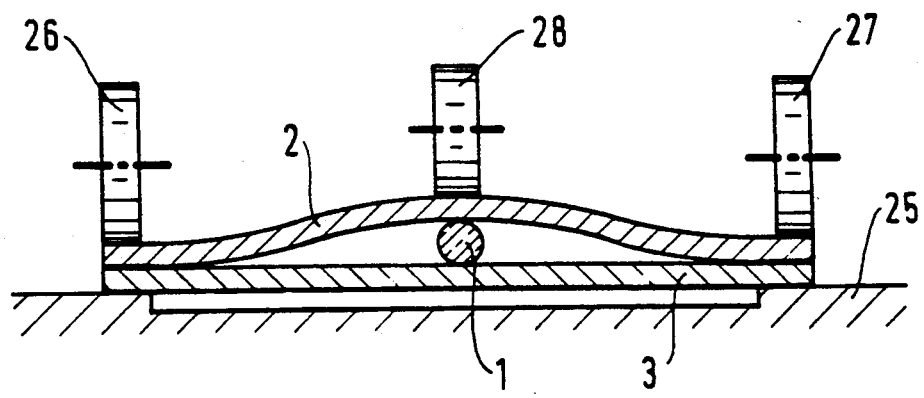
FIG. 6 and 7 illustrate the seam welding method which may be used within the context of the invention.

FIG. 6 shows metal strips being seam welded so as to produce a prestressed fiber-optic sensor. The assembly constituted by metal strips 2 and 3 and optical fiber 1 runs over a supporting conductor 25. This may be achieved by rotating the welding wheels 26 and 27 which press the edges of the superposed strips 2 and 3. Alignment of the edges may be produced by rollers placed upstream and downstream relative to the welding wheels as in FIGS. 2 and 3. The edges may also be aligned by the welding wheels themselves if they include outer shoulders bracketing the edges. A roller 28 may be used to position the fiber 1.

This seam welding operation may also be achieved using a set of four welding wheels comprising two upper and two lower welding wheels arranged in a similar fashion to the pressing wheels 11 and 12 of FIGS. 2 and 3.

Figure 7:
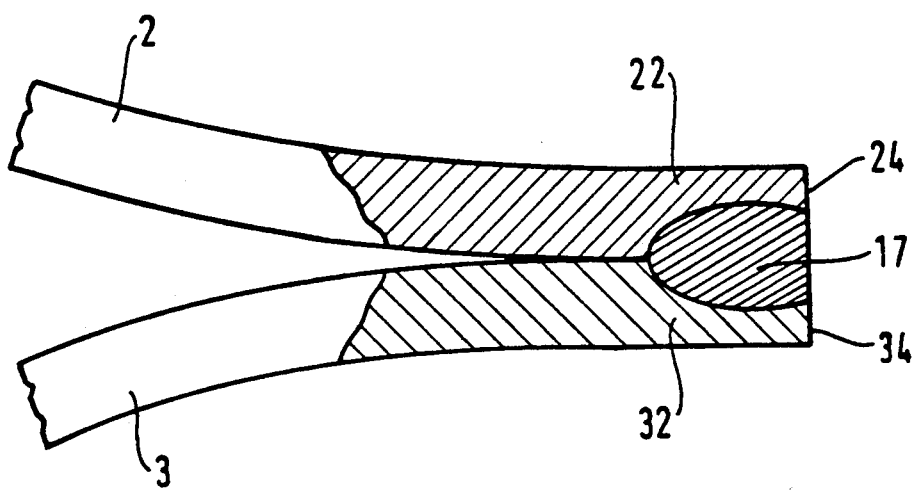

FIG. 7 shows one side of the sensor after welding. The welded zone 17 joins the lateral sides 22 and 32. It can be seen that the welded zone extends up to the edges 24 and 34 therefore ensuring that the sensor is moistureproof.

Figure 8:
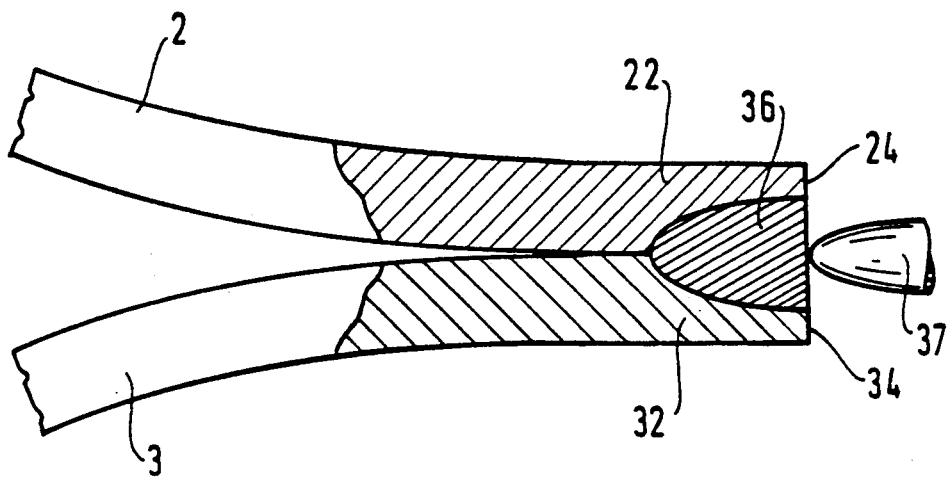
FIG. 8 and 9 illustrate the microplasma welding method which may be used within the context of the invention.

FIG. 8 illustrates metal strips being microplasma welded so as to produce a prestressed fiber-optic sensor. As in laser welding, the weld is achieved from the edges and simultaneously on both sides of the sensor. It is confined to space 36. The metal strips may be guided, the optical fiber may be supported, and pressure may be exerted on the lateral sides as for the laser welding process. The weld is symmetrical if arc 37 is located in the plane in which strips 2 and 3 are joined.

Figure 9:
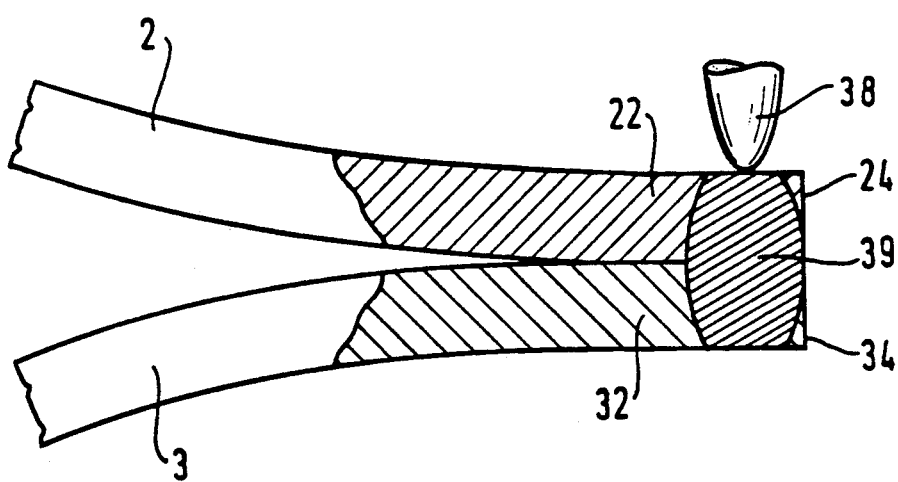

Microplasma welding may also be carried out from the lateral sides and simultaneously on both sides of the sensor, FIG. 9. It must be ensured that the arc 38 producing the weld is close enough to the edges 24 and 34 to ensure that the welded zone 39 extends to the edges 24 and 34. If the metal strips are sufficiently thin and the thermal gradient generated by the arc during the microplasma welding is not too great, the weld obtained is symmetrical with respect to the plane in which strips 2 and 3 are joined.

We claim:

1. Method for producing a prestressed fiber-optic sensor comprising two superposed metal strips (2,3) sheathing an optical fiber (1) and secured to each other along their lateral sides (21,31 and 32,34) to thereby exert a prestress on the optical fiber, said method comprising:
    a step of superposing the lateral sides of the strips and aligning the edges (23,33 and 24,34) of the strips, the superposition of the sides being carried out to produce a desired prestress on the optical fiber after the sides have been secured together; and
    a step of welding the strips to each other so as to unite the adjacent edges after superposition of their lateral sides by welding the superposed strips simultaneously along both sides of the strips and with the same input of energy.

2. A method according to claim 1, said welding step comprises applying laser beams (43,44) along respective lateral edges of the metal strips.

3. A method according to claim 2, wherein said step of applying laser beams comprises splitting a single laser beam into two laser beams.

4. A method according to claim 2, wherein said laser beams are pulsed laser beams.

5. A method according to claim 1, wherein said welding step comprises seam welding both sides of said strips.

6. A method according to claim 1, wherein said welding step comprises microplasma welding both sides of said strips.

7. A method according to claim 6, wherein said welding step comprises microplasma welding said edges of said metal strips.

8. A method according to claim 6, wherein said microplasma welding is carried out along the lateral sides of the metal strips.

9. Apparatus for producing a prestressed fiber-optic sensor comprising two superposed metal strips (2,3) sheathing an optical fiber (1) and secured to each other along their lateral sides (21,31 and 32,34) to thereby exert a prestress on the optical fiber, said apparatus comprising: means for superposing lateral sides of said two superposed metal strips sheathing said optical fiber, means for aligning the edges of the strips, and means for simultaneously welding said superposed strips along both sides of the strips to unit the edges of said superposed strips.

10. Apparatus according to claim 9, wherein said means for superposing the lateral sides of the strips comprise pressing wheels (11,12) for pressing the lateral sides of the strips.

11. Apparatus according to claim 9, wherein said pressing wheels for pressing the lateral sides of the strips comprise wheels situated on either side of the assembly constituted by said two metal strips.

12. Apparatus according to claim 9, further comprising at least one support wheel (13) for engaging the strip in proximity to said optical fiber for maintaining the location of the optical fiber within the superposed lateral sides of the strips.

13. Apparatus according to claim 9, wherein said alignment means comprises laterally opposed rollers (14, 15) engaging opposite sides of said strips between which the metal strips run.

14. Apparatus according to claim 9, wherein said welding means comprises a laser (40) providing a single laser beam (41), and means for optically splitting said single beam into two beams (43,44) of equal energy.

15. Apparatus according to claim 14, wherein said means for optically splitting said single beam comprises a system of mirrors (42,45,46,47,48).

16. Apparatus according to claim 14, said means for optically splitting said single beam comprises a system of optical fibers.

17. In a prestressed fiber-optic sensor comprising two superposed metal strips (2,3) sheathing an optical fiber (1), said strips being secured to each other along lateral first sides (21,31) and lateral second sides (22,32) of said strips by securing means so as to constitute a sheath exerting a prestress on the optical fiber, the improvement wherein said securing means are constituted by continuous welds formed to unite the aligned edges (23,33 and 24,34) of the metal strips, and wherein said welds are made with the same input of energy along both sides of the strips.

* * * * *